US010542261B2

(12) United States Patent
Wang et al.

(10) Patent No.: US 10,542,261 B2
(45) Date of Patent: *Jan. 21, 2020

(54) SYSTEMS AND METHODS FOR PROCESSING A SYNTAX STRUCTURE ASSIGNED A MINIMUM VALUE IN A PARAMETER SET

(71) Applicant: QUALCOMM Incorporated, San Diego, CA (US)

(72) Inventors: Ye-Kui Wang, San Diego, CA (US); Fnu Hendry, Poway, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,255

(22) Filed: Jan. 30, 2018

(65) Prior Publication Data

US 2018/0184091 A1 Jun. 28, 2018

Related U.S. Application Data

(63) Continuation of application No. 14/742,468, filed on Jun. 17, 2015, now Pat. No. 9,918,091.

(51) Int. Cl.
*H04N 19/136* (2014.01)
*H04N 19/31* (2014.01)
(Continued)

(52) U.S. Cl.
CPC ......... *H04N 19/136* (2014.11); *H04N 19/119* (2014.11); *H04N 19/184* (2014.11);
(Continued)

(58) Field of Classification Search
CPC .................................................... H04N 19/70
See application file for complete search history.

(56) References Cited

U.S. PATENT DOCUMENTS 8,780,999 B2  7/2014 Chen et al.
9,241,158 B2  1/2016 Wang
(Continued)

FOREIGN PATENT DOCUMENTS

CN  101658040 A  2/2010
CN  101663893 A  3/2010
(Continued)

OTHER PUBLICATIONS

Boyce J., "BoG report on SHVC/MV-HEVC HLS topics", 15. JCT-VC Meeting; Oct. 23, 2013-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-O0349-v6, Oct. 30, 2013 (Oct. 30, 2013), pp. 1-25, XP030115429, bottom of p. 16 section 1.4.
(Continued)

*Primary Examiner* — Y Lee
*Assistant Examiner* — Young Lee
(74) *Attorney, Agent, or Firm* — Polsinelli LLP

(57) ABSTRACT

Techniques and systems are provided for decoding video data. For example, a method of decoding video data includes receiving, by a decoding device, an encoded video bitstream generated according to a first coding protocol, and determining that a base layer is to be provided to the decoding device as part of an external bitstream that is different from the received encoded video bitstream. The external bitstream is provided to the decoding device by an external source and is not provided as part of the encoded video bitstream. The base layer is encoded using a second coding protocol that is different from the first coding protocol. The method further includes determining to ignore a profile, tier, and level syntax structure assigned to the base layer in the video parameter set in response to determining the base layer is to be provided to the decoding device as part of an external bitstream. The profile, tier, and level syntax structure is assigned a zero value based on the base layer being provided as part of the external bitstream. The method further includes decoding the encoded video data of the encoded video bitstream.

8 Claims, 10 Drawing Sheets

Related U.S. Application Data

(60) Provisional application No. 62/015,380, filed on Jun. 20, 2014.

(51) Int. Cl.

| | | |
|---|---|---|
| *H04N 19/44* | (2014.01) | |
| *H04N 19/184* | (2014.01) | |
| *H04N 19/187* | (2014.01) | |
| *H04N 19/70* | (2014.01) | |
| *H04N 19/30* | (2014.01) | |
| *H04N 19/59* | (2014.01) | |
| *H04N 19/119* | (2014.01) | |
| *H04N 19/169* | (2014.01) | |
| *H04N 19/196* | (2014.01) | |

(52) U.S. Cl.
CPC ......... *H04N 19/187* (2014.11); *H04N 19/188* (2014.11); *H04N 19/196* (2014.11); *H04N 19/30* (2014.11); *H04N 19/31* (2014.11); *H04N 19/44* (2014.11); *H04N 19/59* (2014.11); *H04N 19/70* (2014.11)

(56) References Cited

U.S. PATENT DOCUMENTS

| | | |
|---|---|---|
| 2002/0136292 A1 | 9/2002 | Li |
| 2004/0047423 A1 | 3/2004 | Viscito et al. |
| 2011/0142138 A1 | 6/2011 | Tian et al. |
| 2013/0273945 A1 | 10/2013 | Deshpande et al. |
| 2014/0003489 A1 | 1/2014 | Hannuksela et al. |
| 2014/0003534 A1 | 1/2014 | Haque et al. |
| 2014/0093179 A1 | 4/2014 | Deshpande et al. |
| 2015/0373333 A1 | 12/2015 | Wang |
| 2015/0373344 A1 | 12/2015 | Wang et al. |
| 2015/0373348 A1 | 12/2015 | Wang et al. |

FOREIGN PATENT DOCUMENTS

| | | |
|---|---|---|
| CN | 101682760 A | 3/2010 |
| CN | 103518375 A | 1/2014 |
| WO | 2010021665 A1 | 2/2010 |
| WO | 2011002723 A1 | 1/2011 |
| WO | 2013106705 A2 | 7/2013 |
| WO | 2013153829 A1 | 10/2013 |
| WO | 2013162454 A1 | 10/2013 |
| WO | 2014047175 A1 | 3/2014 |
| WO | 2014058598 A1 | 4/2014 |
| WO | 2015008464 A1 | 1/2015 |
| WO | 2015052935 A1 | 4/2015 |
| WO | 2015057818 A2 | 4/2015 |
| WO | 2015060295 A1 | 4/2015 |
| WO | 2015137237 A1 | 9/2015 |

OTHER PUBLICATIONS

Boyce J., et al., "High level syntax hooks for future extensions", 8. JCT-VC Meeting; 99. MPEG Meeting; Feb. 1, 2012-Feb. 10, 2012 ; San Jose; (Joint Collaborative Team on Video Coding of ISO/IEC JTC1/SC29/WG11 and ITU-T SG.16); URL: http:// wftp3.itu.int/av-arch/jctvc-site/, No. JCTVC-H0388, Jan. 21, 2012(Jan. 21, 2012), XP030111415, pp. 1-8.
Bross B., et al., "High Efficiency Video Coding (HEVC) text specification draft 8", 10. JCT-VC Meeting; 101. MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 Pages.
Chen J., et al., "High efficiency video coding (HEVC) scalable extension Draft 6", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q1008, Apr. 15, 2014 (Apr. 15, 2014), 181 Pages, XP030116232, cited in the application p. 32, paragraph C.6 p. 50, paragraph F.73.2.1.1 p. 51 p. 55, paragraph 7.3.2.1.6 p. 62, paragraph F.73.3 p. 72-p. 73 p. 90, paragraph F.7.3.5.
Chen J., et al., "High Efficiency Video Coding (HEVC) Scalable Extensions Draft 5", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jctvc-site/,, No. JCTVC-P1008-v4, Jan. 22, 2014 (Jan. 22, 2014), XP030115882, 125 pp.
Hannuksela M.M., "AHG10: Comments on JCTVC-R0043/JCT3V-I0022", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0046, May 23, 2014 (May 23, 2014), pp. 1-3, XP030116285, the whole document.
Hannuksela M.M., "MV-HEVC/SHVC HLS: On Additional Layer Sets, Rewriting of Simulcast Layers, and Profile-Tier-Level Indication for Auxiliary Picture Layers", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jcivc-site/, No. JCTVC-Q0078-v4, Apr. 4, 2014 (Apr. 4, 2014), pp. 1-7, XP030115980, the whole document.
He Y., et al., "MV-HEVC/SHVC HLS: On Sub-Bitstream Extraction and Re-Writing Process", 7. JCT-3VMEETING; Jan. 11, 2014-Jan. 17, 2014; San Jose; (The Joint Collaborative Team on 3D Video Coding Extension Development of ISO/IEC JTC1/SC29/WG11 and ITU-T SG.16); URL: http://phenix.int-evry.fr/jct2/, No. JCT3V-G0160-v3, Jan. 13, 2014 (Jan. 13, 2014), pp. 1-8, XP030131944, section 4.1.
Ikai T., et al., "MV-HEVC/SHVC HLS: On Layer Set Definition", 16. JCT-VC Meeting; Jan. 9, 2014-Jan. 17, 2014; San Jose; (Joint Collaborative Team on Video Coding of ISO/IEC JTC1/SC29/WG11 and ITU-T SG.16); URL: http://wftp3.itu.int/av-arch/jcivc-site/, No. JCTVC-P0045, Dec. 29, 2013 (Dec. 29, 2013), pp. 1-9, XP030115507, the whole document.
International Search Report and Written Opinion—PCT/US2015/036422—ISA/EPO—dated Aug. 18, 2015.
"Preliminary Draft of ISO/IEC 23008-2:2013/FDAM2 HEVC Multiview Extensions, v2", 108. MPEG Meeting; Mar. 31, 2014-Apr. 4, 2014; Valencia; (Motion Picture Expert Group or ISO/IEC JTC1/SC29/WG11), No. N14423, Jun. 3, 2014 (Jun. 3, 2014), XP030021159, p. 52 p. 56-p. 59 p. 61-p. 63 p. 130-p. 131.
Sjoberg R., et al., "Overview of HEVC High-Level Syntax and Reference Picture Management", IEEE Transactions on Circuits and Systems for Video Technology, Jan. 1, 2012 (Jan. 1, 2012), XP055045360, 14 pp.
Sullivan G.J., "JCT-VC AHG report: Hybrid codec scalability (AHG15)", 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvcsite/, No. JCTVC-Q0015, Mar. 14, 2014 (Mar. 14, 2014), XP030115906.
Sullivan G.J., "JCT-VC AHG report: Layered Coding Constraint Specifications and Capability Indications (AHG10)", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0010, Jun. 14, 2014 (Jun. 14, 2014), pp. 1-33, XP030116258, the whole document.
"Study Text of ISO/IEC 23008-2:2013/0AM3 HEVC Scalable Extensions", 108. MPEG Meeting; Mar. 31, 2014-Apr. 4, 2014; Valencia; (Motion Picture Expert Group or ISO/IEC JTC1/SC29/WG11), No. N14416, Jun. 23, 2014 (Jun. 23, 2014), XP030021152.
Wang Y., "Support of AVC base layer in SHVC", JCT-VC Meeting; Jan. 9, 2014-Jan. 17, 2014; US; (joint Collaborative team on video coding (JCT-VC) of ITU-T SG 16 WP 3 and ISO/IEC JTC 1/SC 29/WG11; available at: http://phenix.int-evry.fr/jctldoc_end_user/documents/16_San%20Jose/wg11/JCTVC-P0184-v4.zip, No. JCTVC-P1084-v4, Nov. 2, 2014 (Nov. 2, 2014), pp. 1-2, Section F.7.4.4.
Wang Y-K., et al., "MV-HEVC/SHVC HLS: Miscellaneous Cleanups", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0227, Jun. 21, 2014 (Jun. 21, 2014), pp. 1-6, XP030116527, section 1.3.

(56) References Cited

OTHER PUBLICATIONS

Wang Y-K., et al., "MV-HEVC/SHVC HLS: Unavailable and Useless Stuff", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wftp3.itu.int/av-arch/jctvc-site/, No. JCTVC-R0230, Jun. 21, 2014 (Jun. 21, 2014), pp. 1-3, XP030116532, the whole document.

Cho Y., et al., "MV-HEVC/SHVC HLS: Comments on General Decoding Process and Selection of CPB Operation in the HRD Operation", Joint Collaborative Team on Video Coding (JCT-VC) of ITU-T SG 16 WP 3and ISO/IEC JTC 1/SC 29/WG 11, 17th Meeting: Valencia, ES, Mar. 2014, JCTVC-Q0055, pp. 1-4.

Hannuksela M.M., "MV-HEVC/SHVC HLS: On Additional Layersets", Rewriting of Simulcast Layers, and Profile-Tier-Level Indication for Auxiliary Picture, Joint Collaborative Team on Video Coding (JCT-VC)of ITU-T SG 16 WP 3 and ISO/IEC JTC 1/SC 29/WG 11, 17th Meeting: Valencia, ES, Apr. 2014, JCTVC-Q0078r3, pp. 1-7.

Ramasubramonian A.K., et al., "SHVC/MV-HEVC Level Definitions and Related Decoder Capability Requirements", Joint Collaborative Team on Video Coding (JCT-VC) of ITU-T SG 16 WP 3 and ISO/IEC JTC 1/SC 29/WG 11, 18th Meeting: Sapporo, JP, Jun. 6, 2014, JCTVC-R0043v4, pp. 1-7.

Wang Y-K., et al., "HEVCv1/MV-HEVC/SHVC HLS: Conformance Cleanups", Joint Collaborative Team on Video coding (JCT-VC) of ITU-T SG 16 WP 3 and ISO/IEC JTC 1/SC 29/WG 11, 18th Meeting: Sapporo, JP, Jul. 2014, JCTVC-R0272v2, pp. 1-4.

Chen J., et al., "Preliminary version of High efficiency video coding (HEVC) scalable extension Draft 6", JCTVC-Q1008_v1.docx [online], Apr. 15, 2014, pp. i-vi, 1-10, 50-57, 67-85, Retrieved from the Internet http://phenix.intevry.fr/ict/doc_end_user/documents/17_Valencia/wg11/JCTVC-Q1008-v1.zip.

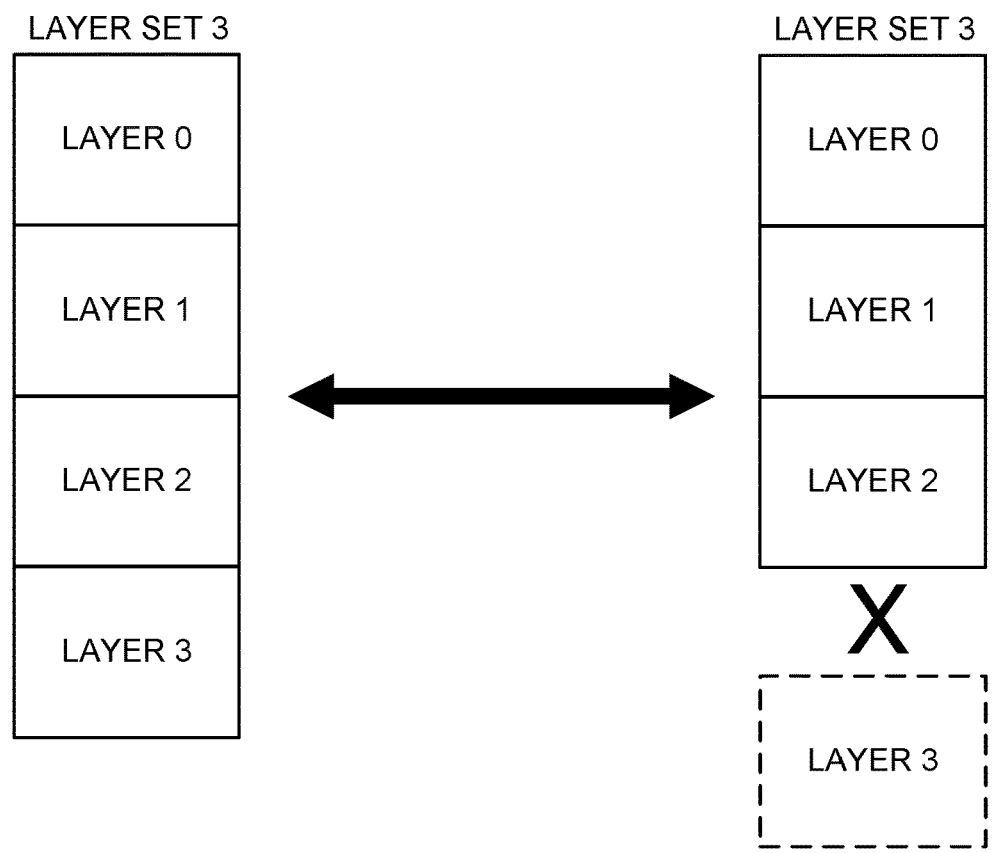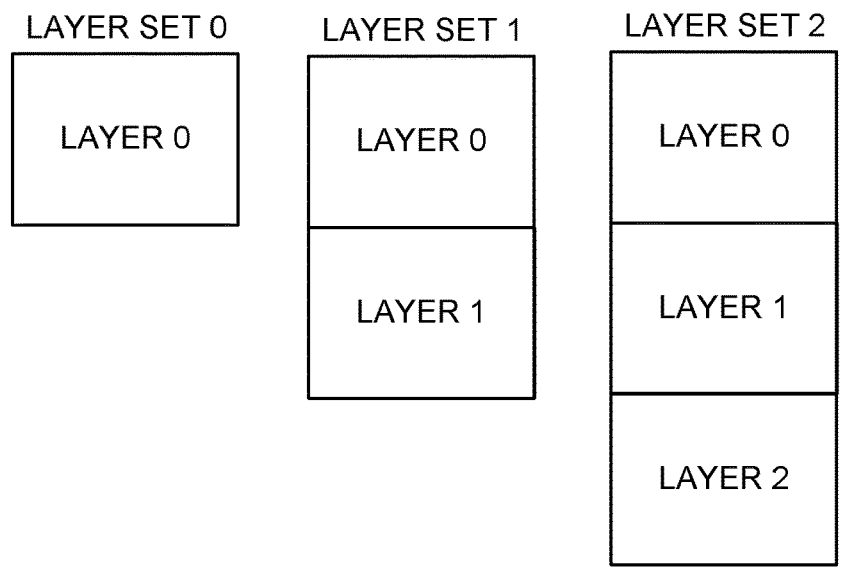
FIG. 3

400

```
GENERATE AN ENCODED VIDEO BITSTREAM
COMPRISING MULTIPLE LAYERS, THE
ENCODED VIDEO BITSTREAM INCLUDING A
PARAMETER SET DEFINING PARAMETERS OF
THE ENCODED VIDEO BITSTREAM
402
```

↓

```
DETERMINE ONE OR MORE PARAMETERS OF
THE PARAMETER SET THAT INCLUDE
INFORMATION DESCRIBING A FIRST SUB-
BITSTREAM OF THE ENCODED VIDEO
BITSTREAM AND INFORMATION DESCRIBING A
SECOND SUB-BITSTREAM OF THE ENCODED
VIDEO BITSTREAM, THE FIRST SUB-
BITSTREAM INCLUDING ONE OR MORE
LAYERS WITH VIDEO DATA, AND THE SECOND
SUB-BITSTREAM INCLUDING ONE OR MORE
LAYERS WITH NO VIDEO DATA
404
```

↓

```
PERFORM A BITSTREAM CONFORMANCE
CHECK ON THE FIRST SUB-BITSTREAM OR
THE SECOND SUB-BITSTREAM BASED ON
WHETHER AT LEAST ONE LAYER OF THE
FIRST SUB-BITSTREAM OR THE SECOND SUB-
BITSTREAM INCLUDES VIDEO DATA
406
```

```
GENERATE, BY AN ENCODER, AN ENCODED
VIDEO BITSTREAM ACCORDING TO A FIRST
CODING PROTOCOL, THE ENCODED VIDEO
BITSTREAM INCLUDING ONE OR MORE
ENHANCEMENT LAYERS AND A VIDEO
PARAMETER SET DEFINING PARAMETERS OF
THE ENCODED VIDEO BITSTREAM
602
```

↓

```
DETERMINE THAT A BASE LAYER IS TO BE
PROVIDED TO A DECODER BY AN EXTERNAL
SOURCE OTHER THAN THE ENCODER
604
```

↓

```
ASSIGN A MINIMUM VALUE TO A SYNTAX
STRUCTURE IN THE VIDEO PARAMETER SET,
THE SYNTAX STRUCTURE DEFINING PROFILE,
TIER, AND LEVEL PARAMETERS FOR THE
BASE LAYER
606
```

GENERATE AN ENCODED VIDEO BITSTREAM COMPRISING MULTIPLE LAYERS, THE ENCODED VIDEO BITSTREAM INCLUDING ONE OR MORE SEQUENCE PARAMETER SETS AND A VIDEO PARAMETER SET
802

↓

GENERATE, ACCORDING TO A CONSTRAINT, ONE OR MORE REPRESENTATION FORMAT PARAMETERS FOR A SEQUENCE PARAMETER SET ASSIGNED TO A BASE LAYER OF THE ENCODED VIDEO BITSTREAM, THE CONSTRAINT LIMITING VALUES OF THE ONE OR MORE REPRESENTATION FORMAT PARAMETERS IN THE SEQUENCE PARAMETER SET TO BE LESS THAN OR EQUAL TO VALUES OF CORRESPONDING REPRESENTATION FORMAT PARAMETERS THAT ARE ASSIGNED TO THE BASE LAYER IN THE VIDEO PARAMETER SET
804

FIG. 8

SYSTEMS AND METHODS FOR PROCESSING A SYNTAX STRUCTURE ASSIGNED A MINIMUM VALUE IN A PARAMETER SET

CROSS-REFERENCE TO RELATED APPLICATIONS

This application is a continuation of U.S. application Ser. No. 14/742,468, filed on Jun. 17, 2015, which claims the benefit of U.S. Provisional Application No. 62/015,380, filed Jun. 20, 2014, both of which are hereby incorporated by reference, in their entirety and for all purposes.

This application is related to U.S. application Ser. No. 14/742,435, filed on Jun. 17, 2015, and U.S. application Ser. No. 14/742,489, filed on Jun. 17, 2015, both of which are hereby incorporated herein by reference, in their entirety and for all purposes.

FIELD

The present disclosure generally relates to video coding, and more specifically to techniques and systems for processing video data with a syntax structure having an assigned minimum value in a parameter set.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described for selectively performing a bitstream conformance check. In some examples, one or more sub-bitstreams may be extracted from a bitstream. For example, one or more layers or sub-layers may be removed from the bitstream to obtain a sub-bitstream. As a result, a sub-bitstream may have less layers or sub-layers than the bitstream. A bitstream conformance check may be performed to determine if a bitstream or a sub-bitstream is in conformance with a particular video coding standard. As described herein, a bitstream conformance check may include performing a normative test using hypothetical reference decoder parameters.

When layers or sub-layers are removed from a bitstream to extract a sub-bitstream, information may be present (e.g., in one or more parameter sets) that describes features and parameters of the removed layers or sub-layers that are no longer present in the bitstream and thus do not include any data. In some embodiments disclosed herein, a bitstream conformance check may be selectively performed on a sub-bitstream based on whether at least one layer of the sub-bitstream includes video data. For example, a bitstream conformance check may be performed only on sub-bitstreams that include video data in one or all of the layers or sub-layers of the sub-bitstreams.

According to at least one example of selectively performing a bitstream conformance check, a method of encoding video data is provided that includes generating an encoded video bitstream comprising multiple layers. The encoded video bitstream includes a parameter set defining parameters of the encoded video bitstream. The method further includes determining one or more parameters of the parameter set that include information describing a first sub-bitstream of the encoded video bitstream and information describing a second sub-bitstream of the encoded video bitstream, the first sub-bitstream including one or more layers with video data, and the second sub-bitstream including one or more layers with no video data. The method further includes performing a bitstream conformance check on the first sub-bitstream or the second sub-bitstream based on whether at least one layer of the first sub-bitstream or the second sub-bitstream includes video data.

In another example, an apparatus is provided that includes a memory configured to store video data and a processor. The processor is configured to and may generate, from the video data, an encoded video bitstream comprising multiple layers. The encoded video bitstream includes a parameter set defining parameters of the encoded video bitstream. The processor is further configured to and may determine one or more parameters of the parameter set that include information describing a first sub-bitstream of the encoded video bitstream and information describing a second sub-bitstream of the encoded video bitstream, the first sub-bitstream including one or more layers with video data, and the second sub-bitstream including one or more layers with no video data. The processor is further configured to and may perform a bitstream conformance check on the first sub-bitstream or the second sub-bitstream based on whether at least one layer of the first sub-bitstream or the second sub-bitstream includes video data.

In another example, a computer readable medium is provided having stored thereon instructions that when executed by a processor perform a method that includes: generating an encoded video bitstream comprising multiple layers, the encoded video bitstream including a parameter set defining parameters of the encoded video bitstream; determining one or more parameters of the parameter set that include information describing a first sub-bitstream of the encoded video bitstream and information describing a second sub-bitstream of the encoded video bitstream, the first sub-bitstream including one or more layers with video data, and the second sub-bitstream including one or more layers with no video data; and performing a bitstream conformance check on the first sub-bitstream or the second sub-bitstream based on whether at least one layer of the first sub-bitstream or the second sub-bitstream includes video data.

In another example, an apparatus is provided that includes means for generating an encoded video bitstream comprising multiple layers. The encoded video bitstream includes a parameter set defining parameters of the encoded video bitstream. The apparatus further includes means for determining one or more parameters of the parameter set that include information describing a first sub-bitstream of the encoded video bitstream and information describing a second sub-bitstream of the encoded video bitstream, the first sub-bitstream including one or more layers with video data, and the second sub-bitstream including one or more layers with no video data. The apparatus further includes means for performing a bitstream conformance check on the first sub-bitstream or the second sub-bitstream based on whether at least one layer of the first sub-bitstream or the second sub-bitstream includes video data.

The method, apparatuses, and computer readable medium described above for selectively performing a bitstream conformance check may further include performing the bitstream conformance check on the first sub-bitstream based on the one or more layers of the first sub-bitstream having video data, wherein a bitstream conformance check is not performed on the second sub-bitstream based on the one or more layers of the second sub-bitstream having no video data. In some embodiments, the bitstream conformance check is performed on the first sub-bitstream when all of the one or more layers of the first sub-bitstream have video data. In some embodiments, the bitstream conformance check is performed on the first sub-bitstream when at least one of the one or more layers of the first sub-bitstream has video data.

In some aspects, the bitstream conformance check includes performing a normative test on the first sub-bitstream to ensure the first sub-bitstream conforms to coding requirements needed for the first sub-bitstream to be decoded. In some cases, the normative test is performed using hypothetical reference decoder parameters.

The method, apparatuses, and computer readable medium described above for selectively performing a bitstream conformance check may further include performing the bitstream conformance check on the first sub-bitstream based on whether a highest value of a temporal identifier of the video data in the first sub-bitstream is equal to or greater than a value of a corresponding temporal identifier of the first sub-bitstream.

In some aspects, the video data of the one or more layers of the first sub-bitstream is present in the first sub-bitstream or is provided from an external source other than an encoder used to generate the encoded video bitstream.

In some aspects, the video data includes one or more video coding layer network abstraction layer units.

In some aspects, the second sub-bitstream is generated from the encoded video bitstream by removing at least one layer from the encoded video bitstream.

In some aspects, the parameter set includes a video parameter set. In some embodiments, the parameter set includes a sequence parameter set.

In some embodiments, techniques and systems are described for assigning a minimum value to a syntax structure in a parameter set. A syntax structure includes multiple syntax elements. In some examples, an encoder that encodes video data according to a first coding protocol may generate an encoded video bitstream. The encoder may provide the encoded video bitstream to a decoder in a receiving device. A base layer for video data may be provided to the decoder (or another decoder in the same receiving device) by an external source other than the encoder that uses the first coding protocol. For example, the base layer may be encoded according to a second coding protocol that is different than the first coding protocol. In such an example, an encoder that encodes video data using the second coding protocol may provide the base layer to the receiving device. A parameter set, such as a video parameter set, may be provided with the video bitstream encoded according to the first coding protocol. The video parameter set may include information related to the video data in the encoded video bitstream. A syntax structure may be present in the video parameter set that includes information regarding a base layer of the encoded video bitstream, even when the base layer is provided externally (a base layer of the first coding protocol is not provided). As described herein, a minimum value may be assigned to the syntax elements in the syntax structure when it is determined that the base layer is to be provided to the receiving device by the external source other than the encoder used to generate an encoded video bitstream.

According to at least one example of assigning a minimum value to a syntax structure in a parameter set, a method of encoding video data is provided that includes generating, by an encoder, an encoded video bitstream according to a first coding protocol. The encoded video bitstream includes one or more enhancement layers and a video parameter set defining parameters of the encoded video bitstream. The method further includes determining that a base layer is to be provided to a receiving device by an external source other than the encoder. The method further includes assigning a minimum value to a syntax structure in the video parameter set when it is determined that the base layer is to be provided to the receiving device by the external source. The syntax structure defines profile, tier, and level parameters for the base layer.

In another example, an encoder is provided that includes a memory configured to store video data and a processor. The processor is configured to and may generate, from the video data, an encoded video bitstream according to a first coding protocol. The encoded video bitstream includes one or more enhancement layers and a video parameter set defining parameters of the encoded video bitstream. The processor is further configured to and may determine that a base layer is to be provided to a receiving device by an external source other than the encoder. The processor is further configured to and may assign a minimum value to a syntax structure in the video parameter set when it is determined that the base layer is to be provided to the receiving device by the external source. The syntax structure defines profile, tier, and level parameters for the base layer.

In another example, a computer readable medium of an encoder is provided having stored thereon instructions that when executed by a processor perform a method that includes: generating an encoded video bitstream according to a first coding protocol, the encoded video bitstream including one or more enhancement layers and a video parameter set defining parameters of the encoded video bitstream; determining that a base layer is to be provided to a receiving device by an external source other than the encoder; and assigning a minimum value to a syntax structure in the video parameter set when it is determined that the base layer is to be provided to the receiving device by the external source, the syntax structure defining profile, tier, and level parameters for the base layer.

In another example, an encoder is provided that includes means for generating an encoded video bitstream according to a first coding protocol, the encoded video bitstream including one or more enhancement layers and a video parameter set defining parameters of the encoded video bitstream. The encoder further includes means for determining that a base layer is to be provided to a receiving device by an external source other than the encoder. The encoder further includes means for assigning a minimum value to a syntax structure in the video parameter set when it is determined that the base layer is to be provided to the receiving device by the external source, the syntax structure defining profile, tier, and level parameters for the base layer.

In some aspects, the minimum value includes a value of 0 for all bits of all syntax elements in the syntax structure. In some aspects, determining that the base layer is to be provided to the receiving device by the external source includes determining that a flag is set to a value indicating that the base layer is provided by the external source.

In some aspects, the base layer provided by the external source is encoded according to a second coding protocol, the second coding protocol being different than the first coding protocol. The first coding protocol includes a high efficiency video coding protocol, and the second coding protocol includes an advanced video coding protocol.

In some aspects, the profile, tier, and level parameters specify constraints on coding tools, bitstream characteristics, buffer characteristics required by the decoding device to decode the base layer, or other parameters.

In some embodiments, techniques and systems are described for constraining representation format parameters for a parameter set. In some examples, representation format parameters that describe video data characteristics (e.g., resolution parameters, bit depth, picture width, color format, or other representation format parameters) may be signaled in a sequence parameter set and/or in a video parameter set. For example, representation format parameters signaled in a video parameter set may provide maximum values for the parameters, while the representation format parameters signaled in a sequence parameter set may provide updated parameter values. As described herein, a constraint may be specified that requires the representation format parameter values signaled in the sequence parameter set to be less than or equal to the representation format parameter values signaled in the video parameter set. In some embodiments, the constraint applies to a sequence parameter set assigned to a base layer of an encoded video bitstream. For example, the constraint may limit an encoder to generating values for the one or more representation format parameters in the sequence parameter set to be less than or equal to values of corresponding representation format parameters that are assigned to the base layer in the video parameter set.

According to at least one example of constraining representation format parameters for a parameter set, a method of encoding video data is provided that includes generating an encoded video bitstream comprising multiple layers. The encoded video bitstream includes one or more sequence parameter sets and a video parameter set. The method further includes generating, according to a constraint, one or more representation format parameters for a sequence parameter set assigned to a base layer of the encoded video bitstream. The constraint limits values of the one or more representation format parameters in the sequence parameter set to be less than or equal to values of corresponding representation format parameters that are assigned to the base layer in the video parameter set.

In another example, an apparatus is provided that includes a memory configured to store video data and a processor. The processor is configured to and may generate, from the video data, an encoded video bitstream comprising multiple layers. The encoded video bitstream includes one or more sequence parameter sets and a video parameter set. The processor is further configured to and may generate, according to a constraint, one or more representation format parameters for a sequence parameter set assigned to a base layer of the encoded video bitstream. The constraint limits values of the one or more representation format parameters in the sequence parameter set to be less than or equal to values of corresponding representation format parameters that are assigned to the base layer in the video parameter set.

In another example, a computer readable medium is provided having stored thereon instructions that when executed by a processor perform a method that includes: generating an encoded video bitstream comprising multiple layers, the encoded video bitstream including one or more sequence parameter sets and a video parameter set; and generating, according to a constraint, one or more representation format parameters for a sequence parameter set assigned to a base layer of the encoded video bitstream, the constraint limiting values of the one or more representation format parameters in the sequence parameter set to be less than or equal to values of corresponding representation format parameters that are assigned to the base layer in the video parameter set.

In another example, an apparatus is provided that includes means for generating an encoded video bitstream comprising multiple layers, the encoded video bitstream including one or more sequence parameter sets and a video parameter set. The apparatus further includes means for generating, according to a constraint, one or more representation format parameters for a sequence parameter set assigned to a base layer of the encoded video bitstream, the constraint limiting values of the one or more representation format parameters in the sequence parameter set to be less than or equal to values of corresponding representation format parameters that are assigned to the base layer in the video parameter set.

In some aspects, the one or more representation format parameters include one or more of resolution, bit depth, picture width, color format, or other video characteristic parameters. In some aspects, the representation format parameters signaled in the video parameter set are used for session negotiation with one or more decoders. In some aspects, the one or more representation format parameters in the sequence parameter set are signaled in one or more high efficiency video coding syntax elements.

The method, apparatuses, and computer readable medium described above for constraining representation format parameters for a parameter set may further include updating the one or more sequence parameter sets according to the constraint.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 3 is a block diagram illustrating an example of an incomplete layer set, in accordance with some embodiments.

FIG. 4 is a flowchart illustrating an embodiment of a process of encoding video data for selectively performing a bitstream conformance check, in accordance with some embodiments.

FIG. 6 is a flowchart illustrating an embodiment of a process of encoding video data for assigning a minimum value to a syntax structure in a parameter set, in accordance with some embodiments.

FIG. 8 is a flowchart illustrating an embodiment of a process of encoding video data for constraining representation format parameters for a parameter set, in accordance with some embodiments.

DETAILED DESCRIPTION

Figure 1:
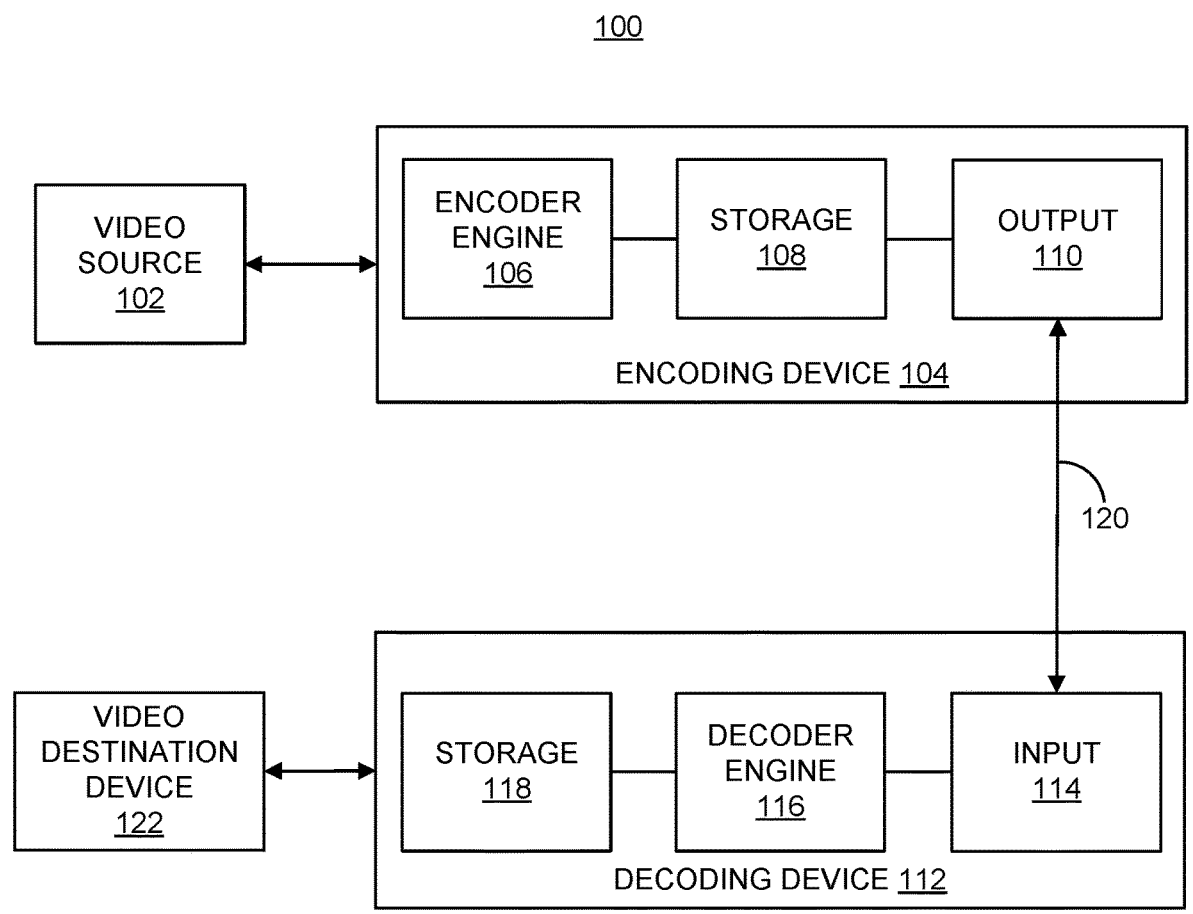
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders and decoders are described herein. For example, one or more systems and methods are directed to handling of unavailable layers, layer sets, and operation points, as well as restrictions on representation format parameters in multi-layer video coding.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol. An HEVC draft specification is available from http://phenix.it-sudparis.eu/jct/doc_end_user/documents/ 17_Valencia/wg11/JCTVC-Q1003-v1.zip. A working draft of MV-HEVC is available from http://phenix.it-sudparis.eu/ jct2/doc_end_user/documents/8_Valencia/wg11/JCT3 V-H1002v5.zip. A working draft of SHVC is available from http://phenix.it-sudparis.eu/jct/doc_end_user/documents/ 17_Valencia/wg11/JCTVC-Q1008-v2.zip.

Many embodiments described herein describe examples using the HEVC standard, or extensions thereof. However, the techniques and systems described herein may also be applicable to other coding standards, such as AVC, MPEG, extensions thereof, or other suitable coding standards. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. An HEVC bitstream, for example, may include a sequence of data units called network abstraction layer (NAL) units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to multiple coded pictures. A coded picture and non-VCL NAL units (if any) corresponding to the coded picture is called an access unit (AU).

NAL units may contain a sequence of bits forming a coded representation of the video data (the encoded video bitstream), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and is square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoder 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a one-dimensional vector, the encoder engine 106 may entropy encode the one-dimensional vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units. A sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). The goal of the parameter sets is bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence or bitstream. A coded video sequence is a series of access units that starts with a random access point picture (e.g., an instantaneous decoding refresh (IDR) picture or broken link access (BLA) picture, or other appropriate random access point picture) and includes all access units up to but not including the next random access point picture (or the end of the bitstream). The information in an SPS does not typically change from picture to picture within a coded video sequence. All pictures in a coded video sequence use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

The output 110 of the encoding device 104 may send the NAL units making up the encoded video data over the communications link 120 to the decoding device 112 of the receiving device. The input 114 of the decoding device 112 may receive the NAL units. The communications link 120 may include a signal transmitted using a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 receives the encoded video data and may provide the video data to the decoder engine 116 or to storage 118 for later use by the decoder engine 116. The decoder engine 116 may decode the encoded video data by entropy decoding (e.g., using an entropy decoder) and extracting the elements of the coded video sequence making up the encoded video data. The decoder engine 116 may then rescale and perform an inverse transform on the encoded video data. Residues are then passed to a prediction stage of the decoder engine 116. The decoder engine 116 then predicts a block of pixels (e.g., a PU). In some examples, the prediction is added to the output of the inverse transform.

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 9. An example of specific details of the decoding device 112 is described below with reference to FIG. 10.

As noted above, extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process (described below). A layer set may correspond to the set of layers that is to be decoded when a decoder wants to operate according to certain parameters.

Sets of hypothetical reference decoder parameters are provided (e.g., in a sequence or video parameter set, or in other messaging) to allow for multi-layer functionality, with each set of parameters corresponding to an operation point. An operation point defines the parameters used for sub-bitstream extraction, and includes a list of target layers (a layer set for that operation point) and a target highest temporal layer. Multiple operation points may be applicable to a given bitstream. An operation point may either include all the layers in a layer set or may be a bitstream formed as a subset of the layer set. For example, an operation point of a bitstream may be associated with a set of layer identifiers and a temporal identifier. A layer identifier list may be used to identify the layers to be included in the operation point. The layer identifier list may be included in a parameter set (e.g., a VPS). The layer identifier list may include a list of layer identifier (ID) values (e.g., indicated by a syntax element nuh_layer_id). In some cases, the layer ID values may include non-negative integers, and each layer may be associated with a unique layer ID value so that each layer ID value identifies a particular layer. A highest temporal ID (e.g., identified by a variable TemporalId) may be used to define a temporal subset. In some embodiments, a layer identifier list and a target highest temporal ID may be used as inputs to extract an operation point from a bitstream. For example, when a NAL unit has a layer identifier that is included in a set of layer identifiers associated with an operation point, and the temporal identifier of the NAL unit is less than or equal to the temporal identifier of the operation point, the NAL unit is associated with the operation point. A target output layer is a layer that is to be output, and an output layer set is a layer set that is associated with a set of target output layers. For example, an output layer set is a set of layers including the layers of a specified layer set, where one or more layers in the set of layers are indicated to be output layers. An output operation point corresponds to a particular output layer set. For example, an output operation point may include a bitstream that is created from an input bitstream by operation of a sub-bitstream extraction process with the input bitstream, a target highest temporal identifier (TemporalId), and a target layer identifier list as inputs, and that is associated with a set of output layers.

Figure 2:
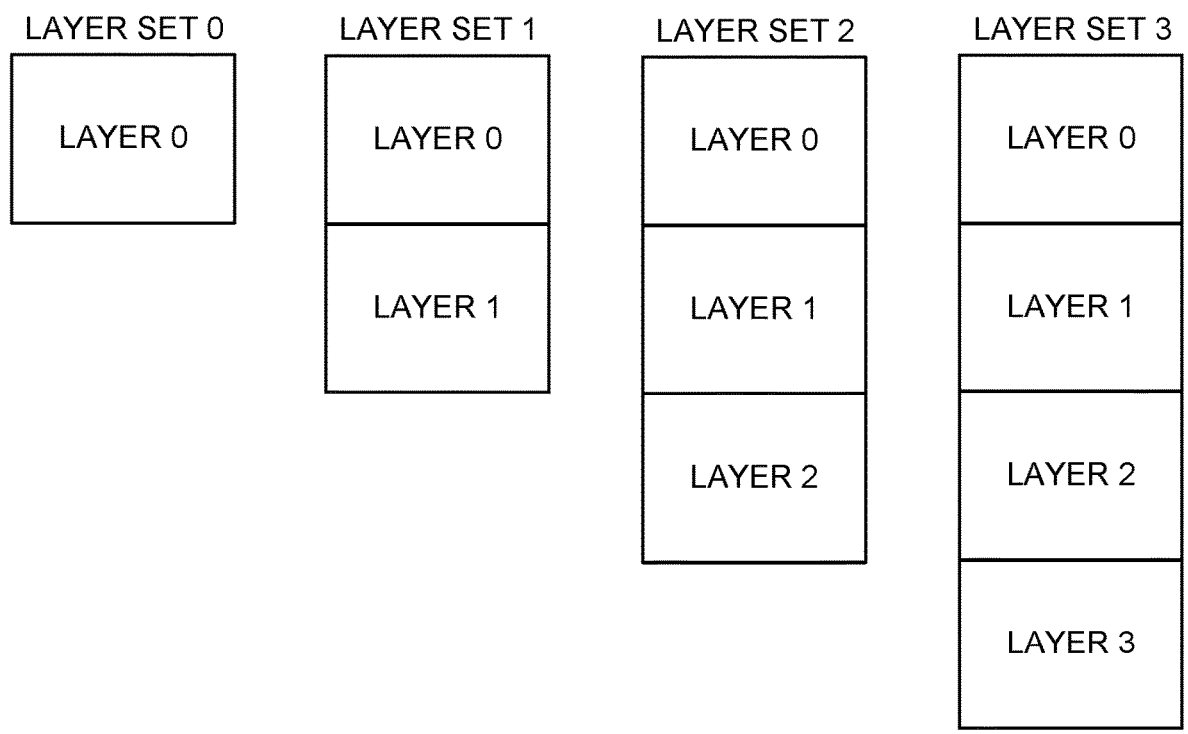
FIG. 2 is a block diagram illustrating an example of layer sets, in accordance with some embodiments.

FIG. 2 is a block diagram illustrating an example of layer sets, including layer set 0, layer set 1, layer set 2, and layer set 3. A different operation point may be associated with each of the layer sets 0, 1, 2, and 3. The layer set 0 includes layer 0. The layer set 1 includes layer 0 and layer 1. The layer set 2 includes layer 0, layer 1, and layer 2. The layer set 3 includes layer 0, layer 1, layer 2, and layer 3. Layer 0 may be a base layer, and layers 1, 2, and 3 may be enhancement layers. For example, layer 0 may have a frame rate of 7.5 Hz and a bit rate of 64 kilobytes per second, layer 1 may have a frame rate of 15 Hz and a bit rate of 128 kilobytes per second, layer 2 may have a frame rate of 15 Hz and a bit rate of 256 kilobytes per second, layer 3 may have a frame rate of 30 Hz and a bit rate of 512 kilobytes per second, and a layer 4 (not shown in the figure) may have a frame rate of 30 Hz and a bit rate of 1 megabyte per second. One of ordinary skill in the art will appreciate that these numbers are provided as an example only, and that the layers may have other frame rates and bit rates according to the particular implementation.

Scalability in coding techniques allows coded data units (e.g. NAL units) of a bitstream to be removed to obtain a resulting sub-bitstream that forms another valid bitstream for a target decoder. Sub-bitstreams represents the source content of a bitstream, but have smaller frame rates (or temporal resolution), spatial resolutions, and/or video fidelity than that of the original bitstream. Temporal scalability allows a bitstream and corresponding sub-bitstreams with scalable frame rates, in which motion compensation dependencies are structured so that complete pictures can be dropped from the bitstream. Spatial scalability allows a bitstream and associated sub-bitstreams with scalable spatial resolutions or picture sizes, in which case the video may be coded at multiple spatial resolutions. In some cases, the data of lower resolutions can be used to predict data or samples of higher resolutions in order to reduce the bit rate to code the higher resolutions. Scalability may also be achieved based on video quality, with video being coded at a single spatial resolution and at different qualities. In some cases, the data of lower qualities can be used to predict data of higher qualities in order to reduce the bit rate to code the higher qualities. A combination of different scalabilities may also be used.

In some examples, one or more layers or temporal sub-layers may be removed from a bitstream to obtain a sub-bitstream with different characteristics (e.g., frame rates, spatial resolutions, video fidelity, or other suitable characteristics). For example, a sub-bitstream extraction process may be used to remove the layers or sub-layers from the bitstream. Layers or sub-layers may be removed for various reasons. For example, a bitstream may be edited by removing a layer in order to lower an amount of data that is needed to transmit the data to a decoding device. As a result of a layer or sub-layer being removed from the bitstream, a sub-bitstream has fewer layers or sub-layers than the original bitstream. Each sub-bitstream is associated with a layer set and corresponding operation point. In some cases, an incomplete layer set and an unavailable (fully or partially) operation point may result from one or more layers being removed from the bitstream.

FIG. 3 is a block diagram illustrating the layer set 3 becoming an incomplete layer set upon removal of a layer. The incomplete layer set may occur when a layer or a temporal sub-layer is extracted or removed from the bitstream to create a sub-bitstream. When a layer or sub-layer is removed, a layer set that included the extracted layer will be incomplete because of the missing layer. In FIG. 3, layer 3 is removed from the bitstream, resulting in the layer set 3 becoming an incomplete layer set and the corresponding operation point for that layer set becoming not fully available. A sub-bitstream may thus correspond to an operation point that is considered not fully available or not at least partially available, as described in more detail below. The remaining layer sets 0, 1, and 2 remain complete, and the corresponding operation points remain fully or at least partially available.

When layers or sub-layers are removed from a bitstream to obtain a sub-bitstream, information may be present (e.g., in one or more parameter sets) that describes features and parameters of the removed layers or sub-layers that are no longer present in the bitstream and thus do not include any data. For example, the VPS in HEVC is designed so that when some layers or sub-layers are removed from the bitstream, the VPS itself does not need to be changed. In other words, the VPS can contain information that describes layers, sub-layers, layer sets, output layer sets, operation points, and output operation points that are no longer present in the bitstream after the sub-bitstream extraction process. Regardless of this feature of the VPS, each sub-bitstream is required to be in conformance with the video coding standard when certain characteristics are met by the sub-bitstream. To test conformance, a bitstream conformance check is performed by an encoder when generating a scalable bitstream or multi-layer bitstream to make sure that each layer set that corresponds to a particular operation point is a conforming sub-bitstream. A bitstream conformance check may include performing a normative test using hypothetical reference decoder parameters. The normative test uses the hypothetical reference decoder parameters to check that a bitstream or sub-bitstream can be decoded by a hypothetical reference decoder that is conceptually connected to the output of an encoder and that includes a coded picture buffer, a decoder, and decoded picture buffer. The encoder must make sure various constraints are met when creating a bitstream to meet conformance, including making sure that the tools used in the bitstream match those signaled in the parameter sets, making sure that the coded picture buffer of the hypothetical reference decoder does not overflow or underflow, making sure pictures marked as used for reference are not used as reference afterwards, or other requirements. A buffer overflow occurs when too many coded data units are present for the decoder buffer. Underflow occurs when it is the time for the decoder to process some coded data units but the buffer is empty.

According to the HEVC standard, a sub-bitstream shall be a conforming bitstream when the sub-bitstream corresponds to an operation point or output operation point associated with a layer set and a target highest value of TemporalId, OpTid, less than or equal to 6 for which the layer set is specified by the VPS. Requiring sub-bitstreams corresponding to operation points that are not available (e.g., due to an incomplete layer set) will cause non-conformance determinations for sub-bitstreams with incomplete layer sets, leading to processing and overhead that may not be necessary. In one example, a base layer may be allowed to be excluded from a layer set, as in the specification text in JCTVC-R0010v1, and such a sub-bitstream may contain zero layers (there are no VCL NAL units). In this example, a base layer may be provided by an external source other than an encoder used to generate the encoded bitstream (e.g., the base layer is AVC coded, and the encoded bitstream is HEVC coded). A sub-bitstream can be extracted from the encoded bitstream to obtain a layer set 0 including the base layer only. As a result, the sub-bitstream is extracted from the encoded bitstream to get only the base layer, leaving no video data in the sub-bitstream (because the base layer is provided from an external source). Requiring an empty or partially empty sub-bitstream to be a conforming bitstream leads to inefficiencies in the coding process. Furthermore, in bitstream conformance tests, each operation point corresponding to a layer set specified in the VPS in HEVC is tested, and each output operation point corresponding to an output layer set specified in the VPS in SHVC/MV-HEVC is tested. However, when not all sub-layers or all layers for an operation point (in HEVC) or an output operation point (in SHVC/MV-HEVC) are available, the bitstream conformance test should not be performed.

In some embodiments disclosed herein, a bitstream conformance check may be selectively performed on a sub-bitstream based on whether at least one layer of the sub-bitstream includes video data. In such embodiments, a bitstream conformance check may be performed only on sub-bitstreams that include video data in one or all of the layers or sub-layers of the sub-bitstreams.

For example, in some embodiments, only sub-bitstreams that correspond to fully available operation points (or output operation points) are required to be conforming bitstreams. In such embodiments, the encoding device 104 may determine operation points that are fully available (e.g., based on information in a parameter set, data present in a sub-bitstream, or other suitable information available to the encoding device 104). The encoding device 104 may only perform a bitstream conformance check on the sub-bitstreams that correspond to fully available operation points. An operation point may be considered fully available if VCL NAL units are available (either present in the bitstream or provided by external means) for each layer included in the layer set corresponding to the operation point. In some examples, an operation point may be considered fully available if VCL NAL units are available for each layer included in the layer set and if the highest value of a temporal ID of all VCL NAL units in the bitstream is equal to or greater than the corresponding temporal ID OpTid of the operation point. In the example illustrated in FIG. 3, the layer set 3 will not be considered fully available because VCL NAL units are not available for layer 3 of the layer set 1. In some cases, an exception may be implemented for operation points for which the corresponding layer set is the layer set 0 (including the base layer only) when the base layer is provided by external means—in which case such operation points may be considered not fully available.

In some embodiments, only sub-bitstreams that correspond to at least partially available operation points (or output operation points) are required to be conforming bitstreams. In such embodiments, the encoding device 104 may determine operation points that are at least partially available (e.g., based on information in a parameter set, data present in a sub-bitstream, or other suitable information available to the encoding device 104). The encoding device 104 may only perform a bitstream conformance check on the sub-bitstreams that correspond to at least partially available operation points. An operation point may be considered at least partially available if VCL NAL units are available (either present in the bitstream or provided by external means) for at least one layer included in the layer set corresponding to the operation point. In the example illustrated in FIG. 3, the layer set 3 may be considered at least partially available if VCL NAL units are available for one of the layers 0, 1, or 2. In some examples, an exception may be implemented for operation points for which the layer set is the layer set 0 (including the base layer only) when the base layer is provided by external means—in which case such operation points are considered not at least partially available.

FIG. 4 illustrates an embodiment of a process 400 of encoding video data. The process 400 is implemented to selectively perform a bitstream conformance check. In some aspects, the process 400 may be performed by a computing device or an apparatus, such as the encoding device 104 shown in FIG. 1 or the encoder 20 shown in FIG. 9. For example, the computing device or apparatus may include an encoder, or a processor, microprocessor, microcomputer, or other component of an encoder that is configured to carry out the steps of process 400.

Process 400 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 402, the process 400 of encoding video data includes generating an encoded video bitstream comprising multiple layers, the encoded video bitstream including a parameter set defining parameters of the encoded video bitstream. In some embodiments, the video data includes or is contained in one or more video coding layer network abstraction layer units (VCL NAL units). In one example, the VCL NAL units may make up the layers 0, 1, 2, and 3 illustrated in FIG. 2. The parameter set may include a video parameter set or a sequence parameter set.

At 404, the process 400 includes determining one or more parameters of the parameter set that include information describing a first sub-bitstream of the encoded video bitstream and information describing a second sub-bitstream of the encoded video bitstream, the first sub-bitstream including one or more layers with video data, and the second sub-bitstream including one or more layers with no video data. The first sub-bitstream may correspond to a first layer set and a corresponding first operation point, for example the layer set 0, 1, or 2 illustrated in FIG. 2. The second sub-bitstream may correspond to a second layer set and a corresponding second operation point, for example the layer set 3 illustrated in FIG. 2. In some embodiments, the video data of the one or more layers of the first sub-bitstream is present in the first sub-bitstream. In some embodiments, the video data of the one or more layers of the first sub-bitstream is provided from an external source other than an encoder used to generate the encoded video bitstream. For example, the first sub-bitstream may correspond to the layer set 0, which includes only a base layer. The base layer, in some examples, may be provided to a decoder from the external source. The second sub-bitstream may be generated from the encoded video bitstream by removing at least one layer from the encoded video bitstream. For example, a sub-bitstream extraction process may be used to generate the second sub-bitstream.

At 406, the process 400 includes performing a bitstream conformance check on the first sub-bitstream or the second sub-bitstream based on whether at least one layer of the first sub-bitstream or the second sub-bitstream includes video data. For example, the process 400 may include performing the bitstream conformance check on the first sub-bitstream based on the one or more layers of the first sub-bitstream having video data. A bitstream conformance check is not performed on the second sub-bitstream based on the one or more layers of the second sub-bitstream having no video data. Accordingly, the bitstream conformance check is performed on the first sub-bitstream because the one or more layers of the first sub-bitstream have video data, and a bitstream performance check is not performed on the second sub-bitstream because the one or more layers of the second sub-bitstream do not have video data.

In some embodiments, the process 400 includes performing the bitstream conformance check on the first sub-bitstream when all of the one or more layers of the first sub-bitstream have video data. In such instances, the bitstream conformance check is only performed on a sub-bitstream when the sub-bitstream corresponds to a fully available operation point, as described above.

In some embodiments, the process 400 includes performing the bitstream conformance check on the first sub-bitstream when at least one of the one or more layers of the first sub-bitstream has video data. In such instances, the bitstream conformance check is only performed on a sub-bitstream when the sub-bitstream corresponds to at least a partially available operation point, as described above.

In some embodiments, the process 400 includes performing the bitstream conformance check on the first sub-bitstream based on whether a highest value of a temporal identifier of the video data in the first sub-bitstream is equal to or greater than a value of a corresponding temporal identifier of the first sub-bitstream. In such embodiments, the bitstream conformance test is performed when VCL NAL units are available (either present in the bitstream or provided by external means) for each layer included in the layer set corresponding to the operation point and also when the highest value of TemporalId of all VCL NAL units in the bitstream is equal to or greater than the corresponding temporal ID OpTid of the operation point.

In some embodiments, the bitstream conformance check includes performing a normative test on the first sub-bitstream to ensure the first sub-bitstream conforms to coding requirements needed for the first sub-bitstream to be decoded. The normative test may be performed using hypothetical reference decoder parameters, as previously described.

Using the above-described techniques, a bitstream conformance check may be limited to sub-bitstreams that correspond to fully or at least partially available operation points. Such techniques allow unnecessary conformance tests on empty or partially empty sub-bitstreams to be avoided.

In further embodiments, techniques and systems are described for assigning a minimum value to a syntax structure in a parameter set. As previously described, NAL units in an encoded bitstream may include parameter sets with high-level information relating to the encoded video bitstream, in addition to other information. One set of information that can be included in a parameter set includes profile, tier, and level parameters or constraints. The profile, tier, and level parameters may be included in a syntax structure of a parameter set (e.g., a VPS or SPS), and may include a profile_tier_level( ) syntax structure. Profiles, tiers, and levels include restrictions on bitstreams and limits on the capabilities needed to decode the bitstreams. Profiles, tiers, and levels may also be used to indicate interoperability points between individual decoder implementations. Examples of profile, tier, and level parameters include constraints on coding tools, bitstream characteristics, buffer characteristics required by the receiving device to decode the base layer, or other parameters.

A profile defines a subset of features and limits that are to be supported by all decoders conforming to that profile. Profiles defined in the HEVC standard include a Main profile, a Main 10 profile, a Main Still Picture profile, Format range extensions profiles, and Format range extensions high throughput profiles.

Levels and tiers may specify additional constraints that a profile must follow. For example, a level of a tier may specify a set of limits on the values that may be taken by the syntax elements of a given coding specification (e.g., HEVC). The same set of tier and level definitions is used with all profiles, but individual implementations may support a different tier, and within a tier a different level, for each supported profile. For any given profile, a level of a tier generally corresponds to a particular decoder processing load and memory capability. Examples of constraints defined by levels and tiers may include constraints on maximum number of slices allowed, maximum number of tiles allowed, maximum bit rate, maximum sample rate, maximum picture size, minimum compression ratio, capabilities of a decoded picture buffer, or other suitable constraints. Lower tiers and levels are more constrained than higher tiers and levels. According to the HEVC standard, two tiers are defined. The tiers include a main tier and a high tier, with the main tier being a lower tier than the high tier. The high tier may be used for applications that require a higher bit rate. A decoder that conforms to a given tier/level must be capable of decoding all bitstreams that are encoded for that tier/level and for all lower tiers/levels. Specific examples of profile, tier, and level limits may be found in the HEVC coding standard, available from http://phenix.it-sud-paris.eu/jct/doc_end_user/documents/17_Valencia/wg11/JCTVC-Q1003-v1.zip.

In some embodiments, techniques and systems are described for assigning a minimum value to a profile, tier, level syntax structure in a parameter set. The minimum value may be assigned when certain situations occur. For example, an encoder (e.g., encoding device 104, encoder 20, or the like) that encodes video data according to a first coding protocol may generate an encoded video bitstream. The encoder may provide the encoded video bitstream to a decoder (e.g., decoding device 112, decoder 30, or the like) in a receiving device. In some examples, the receiving device may receive the encoded video bitstream directly from the encoder. In some examples, the receiving device may receive the encoded video bitstream from a network entity, such as a server, a media-aware network element (MANE), a video editor/splicer, or other such device. A base layer of video data may be encoded according to a second coding protocol that is different than the first coding protocol. In one example, the first coding protocol may be based on the HEVC standard, and the second coding protocol may be based on the AVC standard. The base layer may be provided to the decoder or to another decoder in the same receiving device by an external source other than the encoder that generated the first encoded video bitstream using the first coding protocol. In one example, a multi-standard codec may receive the encoded bitstream (encoded using the first coding protocol) and the base layer (encoded using the second coding protocol). In another example, a first codec may receive and decode the encoded bitstream, and a second codec may receive and decode the base layer. An encoder that encodes video data using the second coding protocol may provide the base layer to the receiving device (e.g., sent to the receiving device directly or via a network entity).

A parameter set (e.g., a VPS), may be provided with the video bitstream encoded according to the first coding protocol. The video parameter set may include information related to the video data in the encoded video bitstream. A syntax structure may be present in the VPS that includes information regarding a base layer of the encoded video bitstream, even when the base layer is provided externally by an external source (in which case a base layer encoded using the first coding protocol may not be provided). The syntax structure may include the profile, tier, and level syntax element described above. When the base layer is externally provided, a first profile_tier_level( ) syntax structure assigned to the base layer in the VPS is meaningless and is ignored by decoders. However, removal of the syntax structure is not an option because the syntax was specified in HEVC version 1, and removal would cause backward compatibility problems. For these reasons, the profile, tier, level syntax structure for the base layer has to be kept in the VPS. Accordingly, an encoder (e.g., encoding device 104, encoder 20, or the like) may assign a minimum value to the profile, tier, level syntax structure for the base layer when it is determined that the base layer is to be provided to the decoder by the external source other than the encoder used to generate the encoded video bitstream. A syntax element in the VPS may include a constraint that signals to the encoder to assign the minimum value. By assigning a minimum value, the number of bits used by the syntax structure is minimized. In one example, the syntax structure may be required to have bits all equal to 0, thus ensuring that a minimal number of bits are used by the syntax structure.

Figure 5:
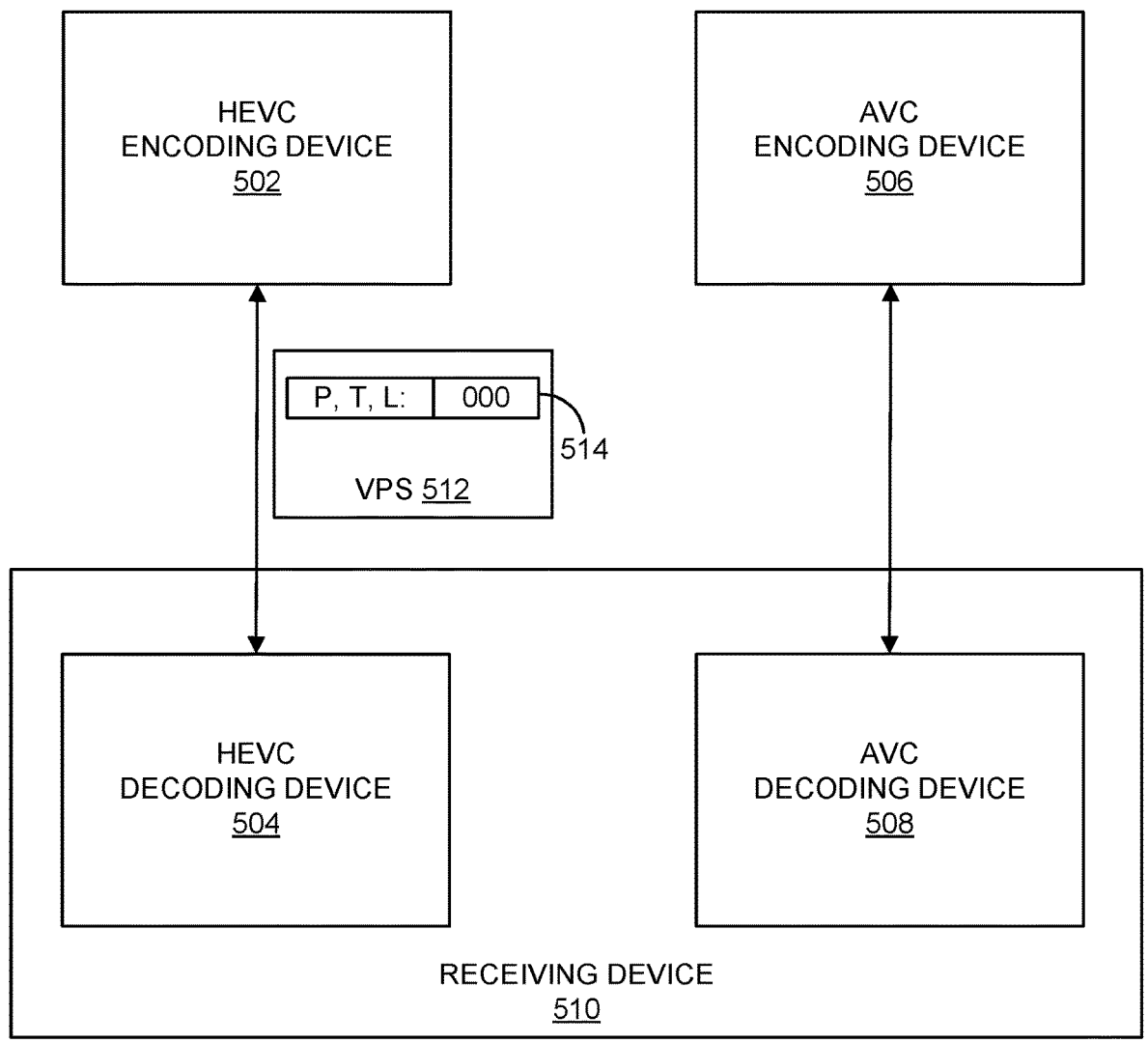
FIG. 5 is a block diagram illustrating an environment with multiple encoding devices for providing encoded video data, in accordance with some embodiments.

FIG. 5 illustrates an example environment 500 in which a minimum value may be assigned to a profile, tier, level syntax structure. The environment 500 includes an HEVC encoding device 502 and an AVC encoding device 506 that generate encoded video bitstreams using different video coding standards. One of ordinary skill in the art will appreciate that the techniques described herein apply to other encoding devices that may use different coding standards than HEVC or AVC. The HEVC encoding device 502 may generate an HEVC compliant video bitstream that includes one or more enhancement layers but no base layer. The AVC encoding device 506 may generate an AVC compliant video bitstream that includes only a base layer. When the HEVC encoding device 502 generates the one or more enhancement layers, the base layer generated by the AVC encoding device 506 may be used for inter-layer prediction reference.

In one example, the HEVC decoding device 504 may receive the enhancement layers from the HEVC encoding device 502, and the AVC decoding device 508 may receive the base layer from the AVC encoding device 506. In another example, a first network entity (e.g., an editor or splicer) may splice the enhancement layers from the HEVC encoding device 502 together with the base layer from the AVC encoding device 506. The first network entity may perform the splicing in a timely synchronous manner with system time information being added (e.g. in a file format according to the ISO base media file format). A second network entity (e.g., a receiver, such as receiving device 510, a file format parser, or other network entity) may pass the bitstream of the one or more enhancement layers to the HEVC decoding device 504 and the bitstream of the base layer to the AVC decoding device 506. In either example, the bitstream of the base layer is not provided to the HEVC decoding device 504. Instead, the decoded pictures of the base layer are provided to the HEVC decoding device 504 (from the AVC decoding device 508) for inter-layer prediction reference. From the point of view of the HEVC decoding device 504, the base layer is externally provided by an external source. In some embodiments, the HEVC decoding device 504 and the AVC decoding device 508 are separate decoders. In some embodiments, the HEVC decoding device 504 and the AVC decoding device 508 are part of a multi-standard decoder that can decode HEVC and AVC bitstreams.

The HEVC encoding device 502 may provide a video parameter set (VPS) 512 with the encoded bitstream (e.g., in one or more non-VCL NAL units). The HEVC encoding device 502 may determine that the base layer is to be provided by an external source other than the HEVC encoding device 502. For example, the HEVC encoding device 502 may determine that one or more flags in the VPS 512 are set to a value indicating that the base layer is provided by the external source. In some embodiments, the one or more flags may include a vps_base_layer_internal_flag. In some embodiments, the one or more flags may include a vps_base_layer_available_flag. In some embodiments, the one or more flags include both the vps_base_layer_internal_flag and the vps_base_layer_available_flag. In one example, if a vps_base_layer_internal_flag is equal to 1 and the vps_base_layer_available_flag is equal to 1, the base layer is present in the HEVC bitstream. In another example, if the vps_base_layer_internal_flag is equal to 0 and the vps_base_layer_available_flag is equal to 1, the base layer is provided by an external means not specified in the HEVC specification. In yet another example, if the vps_base_layer_internal_flag is equal to 1 and the vps_base_layer_available_flag is equal to 0, the base layer is not available (neither present in the HEVC bitstream nor provided by external means) but the VPS includes information of the base layer as if it were present in the HEVC bitstream. In yet another example, if the vps_base_layer_internal_flag is equal to 0 and the vps_base_layer_available_flag is equal to 0, the base layer is not available (neither present in the HEVC bitstream nor provided by external means) but the VPS includes information of the base layer as if it were provided by an external means not specified in the HEVC specification.

Based on the determination that the base layer is to be provided by an external source (e.g., the vps_base_layer_internal_flag is equal to 0 and the vps_base_layer_available_flag is equal to 1), the HEVC encoding device 502 assigns a minimum value to a profile, tier, level syntax structure 514 that is present in the VPS 512. The profile, tier, level syntax structure 514 describes one or more profiles, levels, and tiers for the base layer of the HEVC bitstream. Assignment of the minimum value may include assigning all 0 values to the bits of the profile, tier, level syntax structure 514. The HEVC encoding device 502 may then send the VPS 512 with the encoded bitstream to the HEVC decoding device 504.

FIG. 6 illustrates an embodiment of a process 600 of encoding video data. The process 600 is implemented to assign a minimum value to a syntax structure in a parameter set. In some aspects, the process 600 may be performed by a computing device or an apparatus, such as the encoding device 104 shown in FIG. 1 or the encoder 20 shown in FIG. 9. For example, the computing device or apparatus may include an encoder, or a processor, microprocessor, microcomputer, or other component of an encoder that is configured to carry out the steps of process 600.

Process 600 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 602, the process 600 of encoding video data includes generating, by an encoder, an encoded video bitstream according to a first coding protocol, the encoded video bitstream including one or more enhancement layers and a video parameter set defining parameters of the encoded video bitstream. In some embodiments, an encoding device may generate the encoded video bitstream to include a base layer and the one or more enhancement layers.

At 604, the process 600 includes determining that a base layer is to be provided to a decoding device by an external source and is not to be provided as part of the encoded video bitstream. The external source is a source other than the encoder that generated the encoded video bitstream according to the first coding protocol. The decoding device may operate according to the first coding protocol. In some embodiments, the base layer provided by the external source is encoded according to a second coding protocol that is different than the first coding protocol. For example, the first coding protocol may include a high efficiency video coding protocol, and the second coding protocol may include an advanced video coding protocol. In one example, an encoder configured to generate a bitstream according to the second coding protocol may generate the base layer that is to be provided to the decoding device. A decoding device operating according to the second coding protocol may receive the base layer from the encoder operating according to the second coding protocol, and may provide the base layer to the decoding device operating according to the first coding protocol. In another example, a first network entity (e.g., an editor or splicer) may splice the one or more enhancement layers from the encoder operating according to the first protocol together with the base layer from the encoder operating according to the second protocol. A second network entity (e.g., a receiver or a file format parser) may pass the bitstream of the one or more enhancement layers to a decoding device operating according to the first coding protocol, and may pass the bitstream of the base layer to a decoding device operating according to the second coding protocol. In some embodiments, determining that the base layer is to be provided by the external source includes determining that a flag is set to a value indicating that the base layer is provided by the external source. For example, as described above, the flag may include a vps_base_layer_internal_flag, a vps_base_layer_available_flag, or both flags may be used to indicate that the base layer is to be provided by the external source.

At 606, the process 600 includes assigning a minimum value to a syntax structure in the video parameter set when it is determined that the base layer is to be provided by the external source, the syntax structure defining profile, tier, and level parameters for the base layer. In some embodiments, the minimum value includes a value of 0 for all bits of the syntax structure. In some embodiments, the profile, tier, and level parameters include restrictions on the encoded video bitstream and limits on the capabilities needed to decode the encoded video bitstream. For example, the profile, tier, and level parameters may specify constraints on coding tools, bitstream characteristics, or buffer characteristics required by the decoding device to decode the base layer, or other parameters. The profile, tier, and level parameters may be included in a syntax structure of a parameter set (e.g., a VPS or SPS), and may include a profile_tier_level( ) syntax structure.

Using the above-described techniques, bandwidth and other transmission and processing overhead is reduced by requiring a minimal number of bits to be assigned to unnecessary syntax structures in certain situations. Such techniques minimize the number of bits used by, for example, the profile, tier, level syntax structure.

Figure 7:
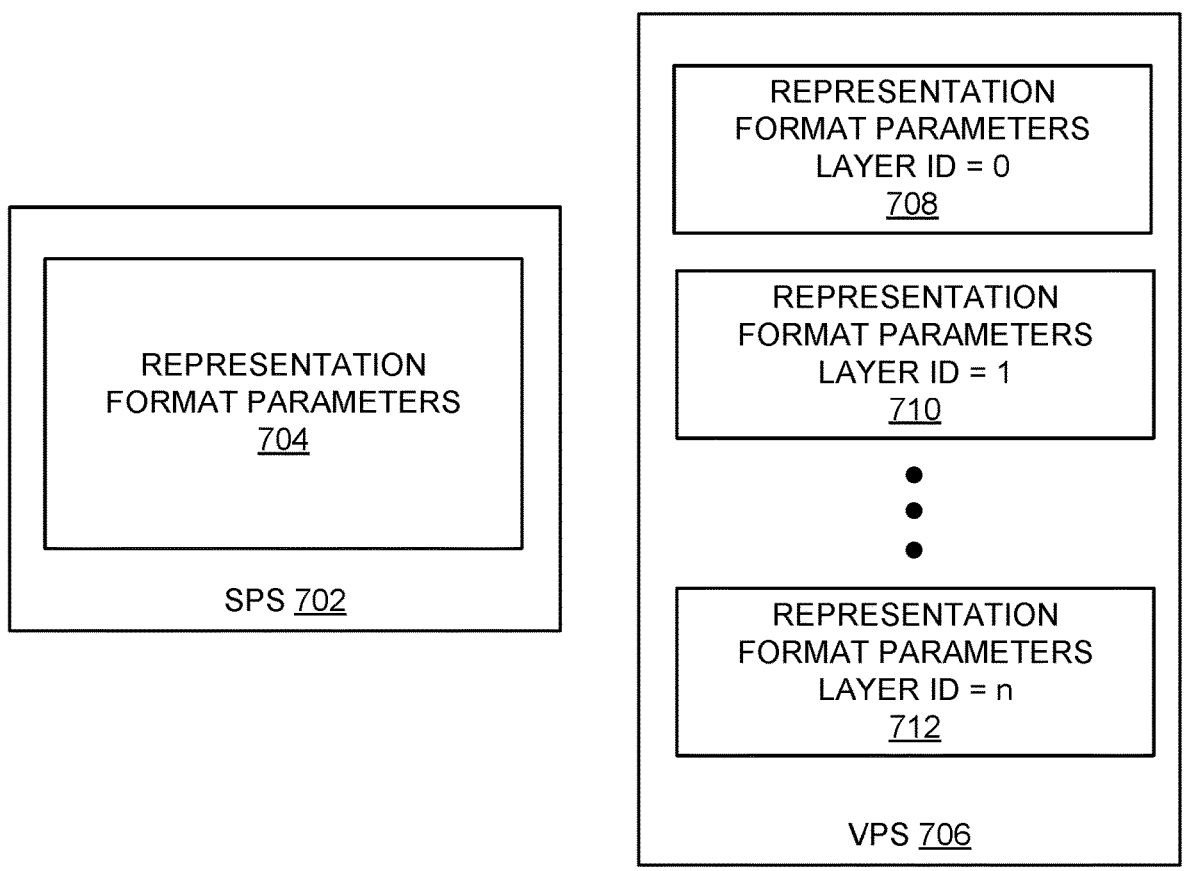
FIG. 7 is a block diagram illustrating an example of a video parameter set and a sequence parameter set with representation format parameters, in accordance with some embodiments.

In further embodiments, techniques and systems are described for constraining representation format parameters for a parameter set. FIG. 7 illustrates an example of a video parameter set (VPS) 706 and a sequence parameter set (SPS) 702. The SPS 702 may be the active SPS for one or more layers in an encoded video bitstream. The SPS 702 includes representation format parameters 704. The SPS 702 may apply to more than one layer, and the representation format parameters 704 apply to all the layers to which the SPS 702 applies. In some embodiments, an SPS applies to only one layer, and thus there may be multiple active SPSs for multiple layers at a particular time. A VPS can include multiple sets of representation format parameters, and each of these sets can be assigned to one or more layers. For example, the VPS 706 includes representation format parameters 708 that apply to a base layer with layer ID=0, representation format parameters 710 that apply to an enhancement layer with layer ID=1, and representation format parameters 712 that apply to an enhancement layer with layer ID=n, indicating that any number of layers and corresponding representation format parameters may exist in the encoded bitstream.

The representation format parameters 704, 708, 710, 712 describe various video data characteristics (e.g., resolution parameters, bit depth, picture width, color format, or other representation format parameters). The representation format parameters 708, 710, 712 signaled in the VPS 706 may provide maximum values for the parameters, and may be used in session negotiation between an encoder of one device and a decoder of another device, among other uses. Session negotiation may be performed between an encoder and a decoder of different devices to agree on an operation point (or output operation point), to determine a maximum resolution, bit rate, or to agree on other characteristic to include in the encoded bitstream. The representation format parameters 704 signaled in the SPS 706 (or other representation format parameters signaled in other SPSs) may provide updated parameter values to those provided in the VPS.

A constraint may be provided indicating that when representation format parameters for a layer are updated in an SPS, the updated representation format parameters shall not be larger than the corresponding representation format parameters for that layer that is assigned in VPS. The objective of the above constraint is to ensure that the values of representation format parameters that are signalled for each layer in the VPS are the largest value of those parameters that a decoder should anticipate for that layer. This informs the decoder how much memory should be allocated to handle pictures of each layer, and is useful in session negotiation to determine whether a decoder can decode a bitstream. However, in some embodiments, the constraint only applies to layers that have a layer ID (e.g., nuh_layer_id) greater than 0 (only layers other than the base layer). For the base layer (layer ID=0), a constraint may not exist that constrains the value of representation format parameters signalled in the active SPS for the base layer. The values of representation format parameters signalled in the active SPS for the base layer can thus be greater than the values of the corresponding representation format parameters that are assigned for the base layer in the VPS. Problems may arise if the constraint is not applied to the base layer. For example, the representation format parameters 708 in VPS 706 may be used during session negotiation with a decoder, and later, the SPS 702 may include representation format parameters that update up to a larger resolution, bit rate, or other characteristic for the base layer. In such cases, the result of the earlier negotiation would not hold and the decoding process may fail. This may also defeat the purpose of constraining the representation format update for other layers. Furthermore, when the picture size information in the VPS instead of the SPS is used for level definitions, allowing an update of the picture size to be greater than that in the VPS would result in a situation in which conforming decoders are not guaranteed to be able to decode the bitstream.

Accordingly, techniques and systems are described for constraining representation format parameters signalled in a parameter set for the base layer. For example, a constraint may be specified that requires the values of the representation format parameters 704 signaled in the SPS 702 (or other representation format parameters signaled in other SPSs) to be less than or equal to the values of the representation format parameters 708, 710, 712 signaled in the VPS 706. The constraint may limit an encoder to generating values for the representation format parameters 704 in the SPS 702 assigned to the base layer to be less than or equal to corresponding values in the representation format parameters 708 that are assigned to the base layer in the VPS 706. For example, the encoder may provide parameter updates in one or more sets of representation format parameters in one or more SPSs (e.g., the representation format parameters 704 in the SPS 702), but may limit the values of the parameters according to the constraint. An example of the constraint for base layer representation format parameters in an SPS may include:

When an SPS with nuh_layer_id equal to 0 is the active SPS of a layer with nuh_layer_id equal to 0, it is a requirement of bitstream conformance that the value of syntax elements chroma_format_idc, separate_colour_plane_flag, pic_width_in_luma_samples, pic_height_in_luma_samples, bit_depth_luma_minus8, or bit_depth_chroma_minus8 present in the SPS shall be less than or equal to chroma_format_vps_idc, separate_colourplane_vps_flag, pic_width_vps_in_luma_samples, pic_height_vps_in_luma_samples, bit_depth_vps_luma_minus8, or bit_depth_vps_chroma_minus8, respectively, of the vps_rep_format_idx[0]-th rep_format( ) syntax structure in the active VPS.

The syntax elements chroma_format_idc, separate_colour_plane_flag, pic_width_in_luma_samples, pic_height_in_luma_samples, bit_depth_luma_minus8, or bit_depth_chroma_minus8 include various parameters in a set of representation format parameters for the SPS. The syntax elements chroma_format_vps_idc, separate_colour_plane_vps_flag, pic_width_vps_in_luma_samples, pic_height_vps_in_luma_samples, bit_depth_vps_luma_minus8, or bit_depth_vps_chroma_minus8 include various parameters in a set of representation format parameters for the VPS.

FIG. 8 illustrates an embodiment of a process 800 of encoding video data. The process 800 is implemented to constrain representation format parameters for a parameter set. In some aspects, the process 800 may be performed by a computing device or an apparatus, such as the encoding device 104 shown in FIG. 1 or the encoder 20 shown in FIG. 9. For example, the computing device or apparatus may include an encoder, or a processor, microprocessor, microcomputer, or other component of an encoder that is configured to carry out the steps of process 800.

Process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 802, the process 800 of encoding video data includes generating an encoded video bitstream comprising multiple layers, the encoded video bitstream including one or more sequence parameter sets and a video parameter set. In one example, the one or more sequence parameter sets include the SPS 702 shown in FIG. 7, and the video parameter set includes the VPS 706.

At 804, the process 800 includes generating, according to a constraint, one or more representation format parameters for a sequence parameter set assigned to a base layer of the encoded video bitstream, the constraint limiting values of the one or more representation format parameters in the sequence parameter set to be less than or equal to values of corresponding representation format parameters that are assigned to the base layer in the video parameter set. The one or more representation format parameters in the sequence parameter set may be signaled in one or more HEVC syntax elements. In some embodiments, the one or more representation format parameters include one or more of resolution, bit depth, picture width, color format, or other format parameters. In some embodiments, the one or more representation format parameters signaled in the video parameter set are used for session negotiation with one or more decoders, as previously described.

In some embodiments, the process includes updating the one or more sequence parameter sets according to the constraint. For example, an apparatus, such as an encoder, may provide representation format parameter updates in a sequence parameter set, but may limit the values of the parameters according to the constraint.

Using the above-described techniques, representation format parameters for a base layer signaled in an SPS can be constrained according to representation format parameters in a VPS. Such techniques allow the results of session negotiations to hold, leading to reliable coding processes. Furthermore, when the picture size information in the VPS instead of the SPS is used for level definitions, a situation in which conforming decoders are not guaranteed to be able to decode the bitstream is avoided because an update of a picture size is not allowed to be greater than that in the VPS.

In further embodiments, other techniques and systems are described herein. For example, as previously described, some layers for which information is included in the VPS may be absent in the bitstream and may not be indicated in the VPS (e.g., a layer ID for that layer may not be present in the VPS). In one example, an HEVC base layer may not be available (e.g., neither in an HEVC encoded video bitstream nor provided by external means). The VPS may indicate that the base layer is not present using, for example, the vps_base_layer_internal_flag, the vps_base_layer_available_flag, or both flags. However, because some layers for which information is included in the VPS may be absent in the bitstream and not indicated in the VPS anyway, there is no good reason to indicate in the VPS that a base layer is not available. In some embodiments, the vps_base_layer_available_flag and/or the vps_base_layer_internal_flag may only be used in the HEVC specification to indicate a requirement for the external means that provides the value of TargetOlsIdx. However, it is out of scope of a video coding specification to specify such requirements for external means, and there are many other similar requirements for external means that are not specified in HEVC, SVC (or SHVC), and MVC (or MV-HEVC). A flag may be used by legacy HEVC decoders to ignore bitstreams with this flag equal to 0. Furthermore, when information in a VPS is used for session negotiation to agree on an (output) operation point, knowing which of the (output) operation points are actually fully available would be useful. Such information would also be useful to a bitstream conformance checker to test only those (output) operation points that are fully available (as previously described). However, a mechanism for signalling of such information is not available in the HEVC standard.

In some embodiments, techniques to resolve the above issues may include removing the vps_base_layer_available_flag from the VPS, designating the current bit for vps_base_layer_available_flag to be reserved or for other use, and adding a supplemental enhancement information (SEI) message to the VPS to indicate which operation points are fully available (in which case it can be determined which are not fully available) or which operation points are not fully available (in which case it can be determined which are available). From the added SEI message, it may be determined whether the base layer is available. In other embodiments, the vps_base_layer_available_flag may be included in the SEI message. In other embodiments, the SEI message can be either provided in the bitstream or through external means, similarly as for parameter sets and the HRD related SEI messages. Information included in the SEI message can be used in the specification of bitstream conformance tests to test only those (output) operation points that are fully available. In other embodiments, the SEI message may indicate which operation points are at least partially available or which operation points are not at least partially available.

In further embodiments, other techniques and systems are described herein. For example, the SVC (or SHVC) and MVC (or MV-HEVC) extensions to HEVC allow for an output layer set to include a layer that is neither an output layer nor needed directly or indirectly for decoding an output layer, and the HRD parameters used for conformance definition take into account such unnecessary layers. To make sure the bitstream sent to the decoder is conforming, such unnecessary layers would be required to be sent to decoder, which leads to a large waste of bandwidth. In some embodiments, techniques to resolve this issue includes disallowing output layer sets from including a layer that is neither an output layer of the output layer set nor needed directly or indirectly for decoding an output layer of the output layer set.

In some embodiments, modifications may be made to the HEVC coding standard. For example, the HEVC syntax may be modified to specify the use of one bit in general_reserved_zero_44bits for the vps_base_layer_available_flag, designate the current bit for vps_base_layer_available_flag to be reserved or for other use, and change the semantics of general_reserved_zero_44bits in the HEVC spec to require decoders to ignore the coded video sequence when general_reserved_zero_44bits is not equal to 0.

The coding techniques discussed herein may be implemented in an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 9:
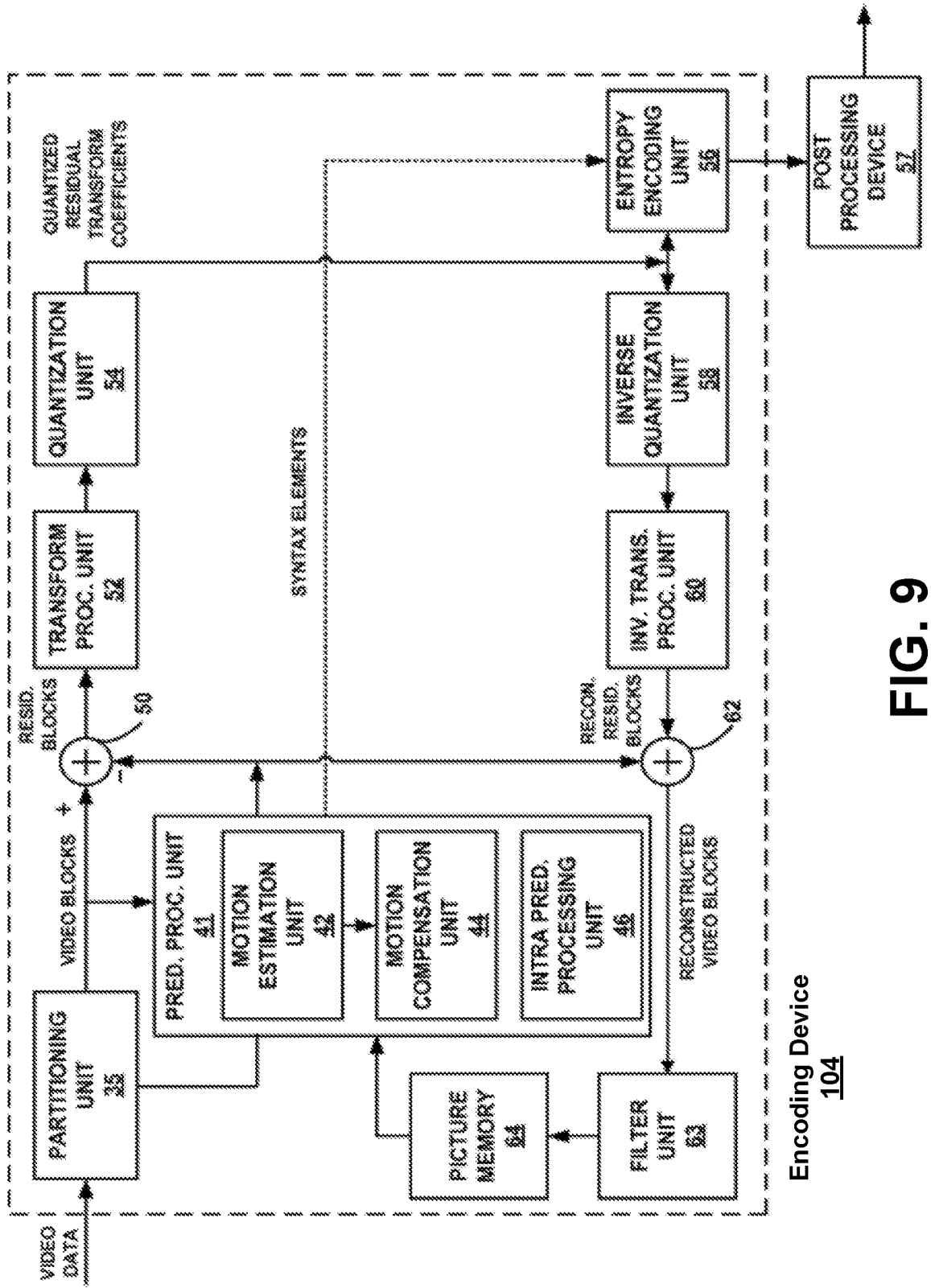
FIG. 9 is a block diagram illustrating an example video encoding device, in accordance with some embodiments.
Figure 10:
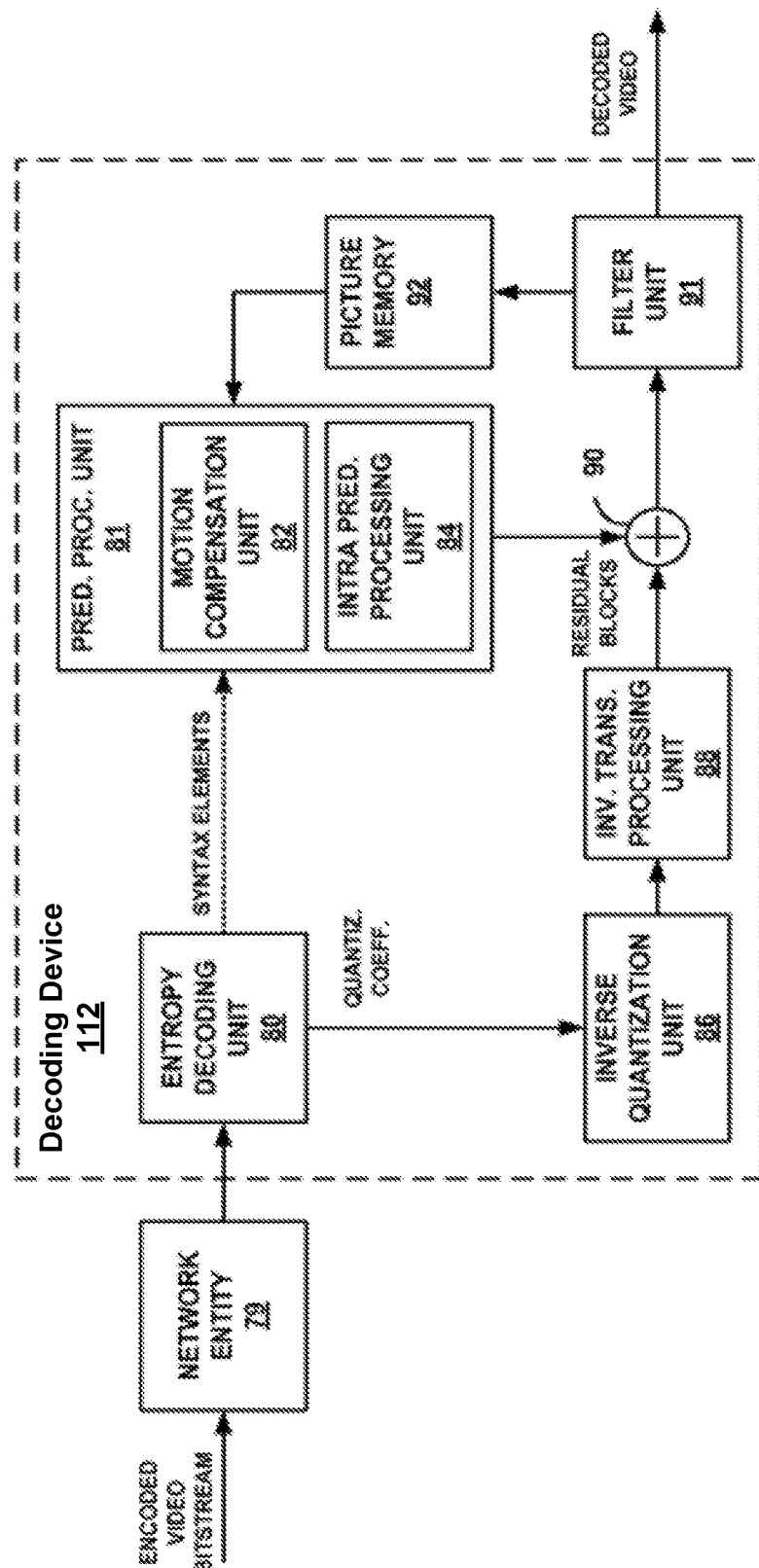
FIG. 10 is a block diagram illustrating an example video decoding device, in accordance with some embodiments.

Specific details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 9 represents an example of a video encoder configured to generate syntax for a encoded video bitstream. The encoding device 104 may, for example, generate VPS, SPS, and PPS parameter sets as described above. The the encoding device 104 may perform any of the techniques described herein, including the processes described above with respect to FIGS. 4, 6, and 8. The techniques of this disclosure have generally been described with respect to the encoding device 104, but as mentioned above, some of the techniques of this disclosure may also be implemented by post processing device 57.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 9.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:

receiving, by a decoding device, an encoded video bitstream, the encoded video bitstream including one or more encoded video frames, wherein the encoded video bitstream is generated by an encoding device according to a first coding protocol, the encoded video bitstream including syntax elements produced by partitioning one or more frames of video data and conducting prediction on the partitioned one or more frames of video data, wherein the encoded video bitstream includes one or more enhancement layers and a video parameter set defining parameters of the one or more encoded video frames included in the encoded video bitstream, and wherein the one or more enhancement layers include one or more syntax elements from the syntax elements produced by the partitioning one or more frames of video data and conducting prediction on the partitioned one or more frames of video data;

determining that a base layer is to be provided to the decoding device as part of an external bitstream, wherein the external bitstream is different from the received encoded video bitstream generated by the encoding device, wherein the external bitstream is provided to the decoding device by an external source and is not provided as part of the encoded video bitstream, wherein the base layer is encoded using a second coding protocol that is different from the first coding protocol, and wherein determining that the base layer is to be provided as part of the external bitstream includes determining that a flag in the encoded video bitstream is set to a value indicating that the base layer is to be provided as part of the external bitstream;

determining to ignore a profile, tier, and level syntax structure assigned to the base layer in the video parameter set in response to determining the base layer is to be provided to the decoding device as part of the external bitstream, wherein the profile, tier, and level syntax structure assigned to the base layer in the video parameter set has a zero value in the encoded video bitstream based on the base layer being provided as part of the external bitstream, wherein the profile, tier, and level syntax structure defines profile, tier, and level parameters for one or more base layers defined using the first coding protocol, and wherein the profile, tier, and level parameters constrain coding tools, bitstream characteristics, or buffer characteristics required by the decoding device to decode the base layer that is to be provided as part of the external bitstream; and decoding the encoded video data of the encoded video bitstream, wherein decoding includes decoding the one or more enhancement layers and the video parameter set, and wherein the encoded video bitstream does not include any base layer.

2. The method of claim 1, wherein the first coding protocol includes a high efficiency video coding protocol, and wherein the second coding protocol includes an advanced video coding protocol.

3. A decoding device, comprising:

a memory configured to store video data; and a processor configured to:

receive an encoded video bitstream, the encoded video bitstream including one or more encoded video frames, wherein the encoded video bitstream is generated by an encoding device according to a first coding protocol, the encoded video bitstream including syntax elements produced by partitioning one or more frames of video data and conducting prediction on the partitioned one or more frames of video data, wherein the encoded video bitstream includes one or more enhancement layers and a video parameter set defining parameters of the one or more encoded video frames included in the encoded video bitstream, and wherein the one or more enhancement layers include one or more syntax elements from the syntax elements produced by the partitioning one or more frames of video data and conducting prediction on the partitioned one or more frames of video data;

determine that a base layer is to be provided to the decoding device as part of an external bitstream, wherein the external bitstream is different from the received encoded video bitstream generated by the encoding device, wherein the external bitstream is provided to the decoding device by an external source and is not provided as part of the encoded video bitstream, wherein the base layer is encoded using a second coding protocol that is different from the first coding protocol, and wherein determining that the base layer is to be provided as part of the external bitstream includes determining that a flag in the encoded video bitstream is set to a value indicating that the base layer is to be provided as part of the external bitstream;

determine to ignore a profile, tier, and level syntax structure assigned to the base layer in the video parameter set in response to determining the base layer is to be provided to the decoding device as part of the external bitstream, wherein the profile, tier, and level syntax structure assigned to the base layer in the video parameter set has a zero value in the encoded video bitstream based on the base layer being provided as part of the external bitstream, wherein the profile, tier, and level syntax structure defines profile, tier, and level parameters for one or more base layers defined using the first coding protocol, and wherein the profile, tier, and level parameters constrain coding tools, bitstream characteristics, or buffer characteristics required by the decoding device to decode the base layer that is to be provided as part of the external bitstream; and decode the encoded video data of the encoded video bitstream, wherein decoding includes decoding the one or more enhancement layers and the video parameter set, and wherein the encoded video bitstream does not include any base layer.

4. The decoding device of claim 3, wherein the first coding protocol includes a high efficiency video coding protocol, and wherein the second coding protocol includes an advanced video coding protocol.

5. A non-transitory computer-readable medium of a decoding device having stored thereon instructions that, when executed by one or more processors, cause the one or more processors to:

receive an encoded video bitstream, the encoded video bitstream including one or more encoded video frames, wherein the encoded video bitstream is generated by an encoding device according to a first coding protocol, the encoded video bitstream including syntax elements produced by partitioning one or more frames of video data and conducting prediction on the partitioned one or more frames of video data, wherein the encoded video bitstream includes one or more enhancement layers and a video parameter set defining parameters of the one or more encoded video frames included in the encoded video bitstream, and wherein the one or more enhancement layers include one or more syntax elements from the syntax elements produced by the partitioning one or more frames of video data and conducting prediction on the partitioned one or more frames of video data;

determine that a base layer is to be provided to the decoding device as part of an external bitstream, wherein the external bitstream is different from the received encoded video bitstream generated by the encoding device, wherein the external bitstream is provided to the decoding device by an external source and is not provided as part of the encoded video bitstream, wherein the base layer is encoded using a second coding protocol that is different from the first coding protocol, and wherein determining that the base layer is to be provided as part of the external bitstream includes determining that a flag in the encoded video bitstream is set to a value indicating that the base layer is to be provided as part of the external bitstream;

determine to ignore a profile, tier, and level syntax structure assigned to the base layer in the video parameter set in response to determining the base layer is to be provided to the decoding device as part of the external bitstream, wherein the profile, tier, and level syntax structure assigned to the base layer in the video parameter set has a zero value in the encoded video bitstream based on the base layer being provided as part of the external bitstream, wherein the profile, tier, and level syntax structure defines profile, tier, and level parameters for one or more base layers defined using the first coding protocol, and wherein the profile, tier, and level parameters constrain coding tools, bitstream characteristics, or buffer characteristics required by the decoding device to decode the base layer that is to be provided as part of the external bitstream; and decode the encoded video data of the encoded video bitstream, wherein decoding includes decoding the one or more enhancement layers and the video parameter set, and wherein the encoded video bitstream does not include any base layer.

6. The non-transitory computer-readable medium of claim 5, wherein the first coding protocol includes a high efficiency video coding protocol, and wherein the second coding protocol includes an advanced video coding protocol.

7. A decoding device, comprising:

means for receiving an encoded video bitstream, the encoded video bitstream including one or more encoded video frames, wherein the encoded video bitstream is generated by an encoding device according to a first coding protocol, the encoded video bitstream including syntax elements produced by partitioning one or more frames of video data and conducting prediction on the partitioned one or more frames of video data, wherein the encoded video bitstream includes one or more enhancement layers and a video parameter set defining parameters of the one or more encoded video frames included in the encoded video bitstream, and wherein the one or more enhancement layers include one or more syntax elements from the syntax elements, produced by the partitioning one or more frames of video data and conducting prediction on the partitioned one or more frames of video data;

means for determining that a base layer is to be provided to the decoding device as part of an external bitstream, wherein the external bitstream is different from the received encoded video bitstream generated by the encoding device, wherein the external bitstream is provided to the decoding device by an external source and is not provided as part of the encoded video bitstream, wherein the base layer is encoded using a second coding protocol that is different from the first coding protocol, and wherein determining that the base layer is to be provided as part of the external bitstream includes determining that a flag in the encoded video bitstream is set to a value indicating that the base layer is to be provided as part of the external bitstream;

means for determining to ignore a profile, tier, and level syntax structure assigned to the base layer in the video parameter set in response to determining the base layer is to be provided to the decoding device as part of the external bitstream, wherein the profile, tier, and level syntax structure assigned to the base layer in the video parameter set has a zero value in the encoded video bitstream based on the base layer being provided as part of the external bitstream, wherein the profile, tier, and level syntax structure defines profile, tier, and level parameters for one or more base layers defined using the first coding protocol, and wherein the profile, tier, and level parameters constrain coding tools, bitstream characteristics, or buffer characteristics required by the decoding device to decode the base layer that is to be provided as part of the external bitstream; and means for decoding the encoded video data of the encoded video bitstream, wherein decoding includes decoding the one or more enhancement layers and the video parameter set, and wherein the encoded video bitstream does not include any base layer.

8. The decoding device of claim 7, wherein the first coding protocol includes a high efficiency video coding protocol, and wherein the second coding protocol includes an advanced video coding protocol.

\* \* \* \* \*